May 24, 1932.  A. E. PAYSON ET AL  1,859,886
DISPENSING DEVICE
Filed Feb. 26, 1929
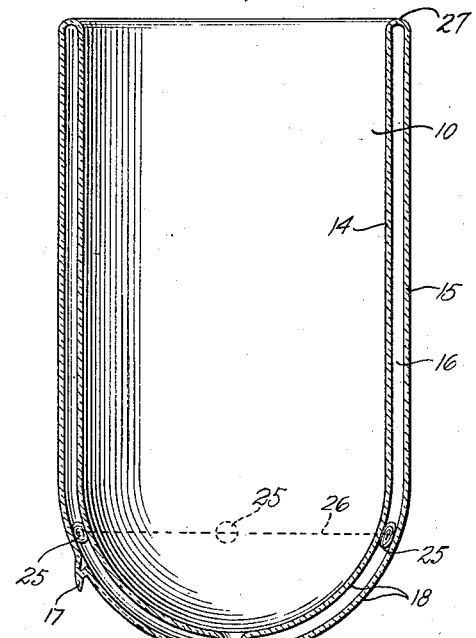
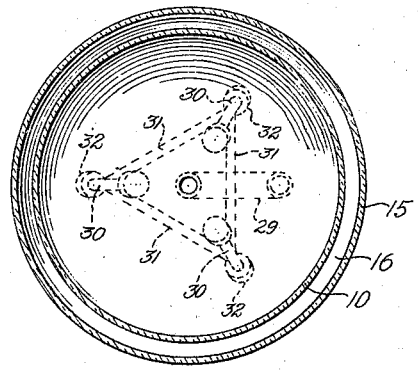
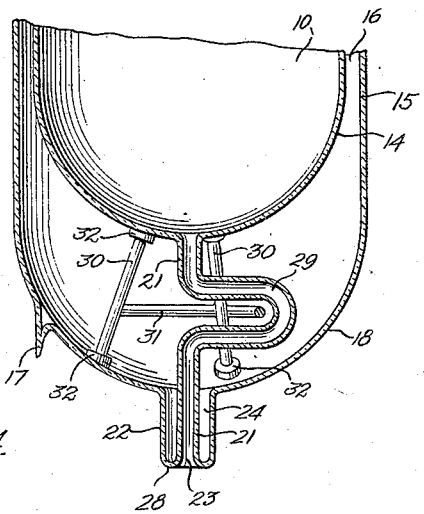
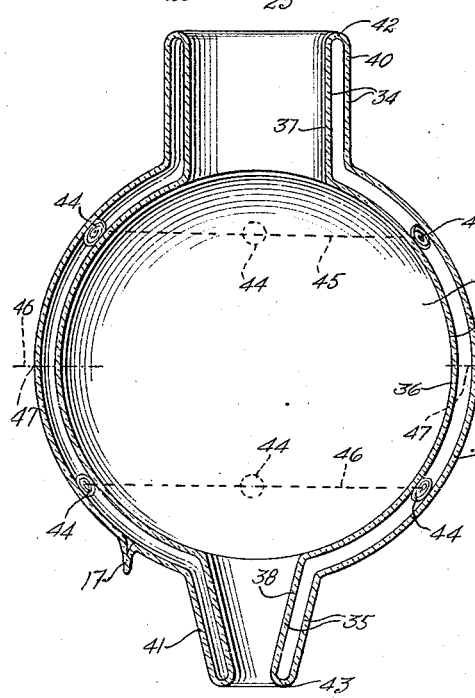
INVENTORS
MINER P. WETMORE
AURIN E. PAYSON
BY
ATTORNEY Patented May 24, 1932

1,859,886

UNITED STATES PATENT OFFICE

AURIN E. PAYSON AND MINER P. WETMORE, OF NORWICH, CONNECTICUT

DISPENSING DEVICE

Original application filed April 6, 1928, Serial No. 268,013. Divided and this application filed February 26, 1929. Serial No. 342,711.

Our invention is for a receptacle of novel construction particularly adapted for cooling and dispensing beverages. One feature of our new apparatus comprises a double-walled vacuum jar, preferably of pyrex glass, having a double-walled pipe through which the contents pass out. This pipe consists of a pair of tubes attached, respectively, to the inner and outer walls of the jar. When the two containers or cylinders of the jar are assembled, the two tubes are in concentric spaced relation and are sealed at their outer ends. In this way, the double-walled pipe forms a tubular continuation of the annular vacuum chamber between the walls of the jar. In one form of our invention, the inner tube has a lateral bend adapted to take up movements of the glass walls under changes of temperature. The glass jar may be cylindrical or spherical, and is particularly suitable for devices in which refrigerated beverages are dispensed.

In order to explain our invention so that its various features and advantages may be fully understood, we have selected several embodiments for illustration and description. In the accompanying drawings—

Fig. 1 shows a cross-sectional view of a cylindrical vacuum jar constructed in accordance with our invention;

Fig. 2 is a cross-sectional fragmentary view of a modified form of jar, in which the discharge tube is bent laterally;

Fig. 3 is a plan of Fig. 2; and

Fig. 4 represents a vertical cross-section of a double-walled dispensing jar with a spherical body.

Referring first to Fig. 1, there is a glass jar 10 of the double-walled vacuum type comprising an inner wall 14 and an outer wall 15 separated by an annular chamber 16, which is evacuated through a tip 17 at the bottom of the jar in a manner well understood by those familiar with glassware of that kind. Jars of large size (say, of 5-gallon capacity or more) are preferably made of pyrex glass, so that they can be handled and used more safely. From the spherical bottom 18 of the jar extends a double-walled glass pipe consisting of an inner tube 21 attached to the inner wall 14 and an outer tube 22 attached to the outer wall 15. The tubes 21 and 22 are fused at their inner ends to the walls of the jar, so that the double-walled pipe thus formed is an integral tubular extension of the body of the jar. The concentric tubes 21 and 22 are fused together at their outer ends to make an airtight seal, and the passage 23 formed by the inner tube 21 is open to the interior of the jar. In other words, the double-walled pipe 21—22 forms an outlet for the jar. The annular space 24 between the tubes 21 and 22 is a continuation of the annular chamber 16 between the walls of the jar, so that the inner tube 21 through which the liquid flows is heat-insulated by a vacuum from the outer tube 22 (except at the sealed tip).

In the practical construction of the double-walled glass jar 10, the outer and inner walls are formed separately in molds, but without the tubular extensions 21 and 22. The glass tubes 21 and 22 are then fused to the rounded bottoms of the inner and outer containers 14 and 15. In assembling the jar, the inner container is inserted into the outer container, with the inner tube 21 passing into the outer tube 22. Spacing pads 25 of asbestos or other non-conducting material hold the two containers in concentric relation. These pads are usually connected by a wire ring 26 to hold them in place. The assembled containers 14 and 15 are sealed at the neck 27 by fusion of the glass, and the outer ends of the tubes 21 and 22 are sealed at 28 in the same way. Or, the outer tube may be fused to the outer container 15 after the latter has been positioned over the inner container, and the two containers fused at the neck 27 and at the discharge end 28. It is immaterial which of the sealed joints 27 and 28 is made first. The jar 10 being thus completed, the vacuum chamber 16 and its tubular continuation 24 are connected to a vacuum pump through the tip 17.

In the modified form of glass jar shown in Figs. 2 and 3, the inner tube 21 has a lateral U-shaped bend 29 which automatically accommodates itself to movements of the tube and the inner container 14 due to expansion and contraction of the glass under changes of temperature. The lateral bend 29 acts like a spring and prevents breakage of the tube. Actual tests have shown that this U-shaped bend will give as much as one-eighth inch movement without breaking. This construction is particularly advantageous in jars of large capacity. To make room for the lateral bend 29 of tube 21, the rounded base of the inner container 14 in Fig. 2 requires considerable spacing from the bottom 18 of the outer container 15. Ordinary spacing pads like 25 in Fig. 1 will not do, and we therefore provide a tripod arrangement comprising three brass tubes 30 rigidly connected by rods 31 and carrying at their ends heat-insulating pads 32, which may be pieces of asbestos, cork, and the like. The rods 30 act like braces between the rounded bottoms of the containers 14 and 15, so that the annular chamber 16 may be exhausted without danger of breaking or pulling down the base of the inner container. The spacing of rods 30 is such that the tripod is easily inserted in place without hindrance by the lateral bend 29. In assembling the jar, the inner container is supported in inverted position, the bent tube 21 is fused in place, the tripod 30 is then placed on the base of the inverted container, then the outer container 15 with tube 22 is inserted over the inner container, whereupon the jar is sealed at the neck and at the discharge end of tubes 21—22. Otherwise what has been said about Fig. 1 applies to the jar of Figs. 2 and 3.

Fig. 4 illustrates another embodiment of our new receptacle. Here we have a double-walled vacuum jar 32 comprising a substantially spherical or globe-shaped body 33, a cylindrical neck 34, and a double-walled discharge pipe 35, which is here shown as tapering or conical. The inner wall 36 is formed at one end with a cylindrical extension 37, and at the other end with a conical extension 38. The outer wall 39 has a cylindrical extension 40 on top and a tapering extension 41 at the bottom. The cylindrical extensions 37 and 40 are sealed at 42 and form the double-walled neck 34. The conical extensions 38 and 41 are sealed at 43 and form the double-walled conical pipe or tube 35 through which the contents of the jar pass out. The spherical walls of jar 32 are spaced by two sets of pads 44, which are usually of asbestos and held together by a wire 45.

An easy way to assemble the parts of jar 32 is this: The inner and outer walls 36 and 39 are blown separately in suitable molds, with the integral extensions 37—40 and 38—41, respectively. The next step is to crack the outer bulb 39 transversely across the center 46. The upper half of bulb 39 is now inserted over the top of the inner part 36, the two parts being held in spaced concentric relation by the pads 44. The neck extensions 37 and 40 are fused at 42. The final step is to place the lower half of bulb 39 over the lower half of the inner part 36, whereupon the parts are sealed at 43 and at the previously severed edge 47. The assembled jar is now ready for exhausting through tip 17 in the usual way. If the circumferential seal 47 is not perfectly smooth, that matters not in the least. The jar 32, like the jar 10 of Figs. 1 and 2, is preferably made of pyrex glass, or other glass capable of standing up under conditions of actual use. The spherical shape of the bottle or jar 32 gives it unusual strength. The double-walled discharge pipe 35 need not be conical, but may obviously be cylindrical.

In the basic aspect of our invention, the double-walled vacuum jar with its double-walled discharge pipe may be put to any practical use. No support for the jar has been shown, because that is not part of this invention. Although we have shown and described certain specific constructions, it should be understood that this invention is not limited to any of the details set forth unless so specified in the claims. This application is a division of our copending case Serial Number 268,013, filed April 6, 1928.

We claim as our invention:

1. A double-walled vacuum jar of glass open at the top and provided at the bottom with a double-walled discharge pipe of glass integral with the body of the jar, the inner tube of said double-walled pipe communicating with the interior of the jar and being open to the outside.

2. A double-walled vacuum jar having a double-walled pipe extending therefrom, said pipe consisting of an inner tube attached to the inner wall of the jar and an outer tube attached to the outer wall of the jar, said inner tube being open to the inside of the jar and having a lateral bend arranged in the vacuum chamber of the jar, the outer ends of said tubes being connected in a sealed joint, and a bracing device arranged around said inner tube in the vacuum chamber, said bracing tube engaging the base portion of the inner and outer cylinders of said jar.

3. A double-walled vacuum receptacle having a mouth for filling the same and a double-walled extension forming a discharge opening for the contents of the receptacle, the space between the walls of said extension being open to the vacuum chamber of the receptacle.

4. A double-walled vacuum receptacle of glass having a double-walled tubular extension opposite the mouth of the receptacle and open to the interior and exterior thereof, the annular space between the walls of said extension being open to the vacuum chamber of the receptacle.

5. A double-walled vacuum receptacle of glass having a doubled-walled glass pipe extending from the bottom and open at its outer end, said pipe communicating with the interior of the receptacle and comprising a pair of spaced concentric tubes attached respectively to the inner and outer walls of the receptacle, said double-walled pipe forming a continuation of the annular vacuum chamber of said receptacle.

6. A double-walled vacuum jar having a double-walled pipe extending therefrom, said pipe consisting of an inner tube attached to the inner wall of the jar and an outer tube attached to the outer wall of the jar, said inner tube being open to the inside of the jar and having a lateral bend arranged in the vacuum chamber of the jar, the outer ends of said tubes being connected in a sealed joint.

7. A double-walled vacuum jar of glass comprising a spherical body having two double-walled extensions diametrically arranged, said extensions constituting inlet and outlet pipes open to the exterior and to the interior of the body, the outer ends of the walls of said extensions being sealed and the space between the sealed walls of said extensions being a continuation of the space between the walls of said spherical body.

8. A double-walled vacuum jar comprising a spherical body having a cylindrical neck on top and a conical tube at the bottom, said neck and said tube being open to the outside and to the interior of the body, the double wall of said jar extending from the top of the neck to the bottom of said tube, so that the vacuum chamber between the walls surrounds the inner wall of the cylindrical neck and the inner wall of the conical tube.

9. A double-walled vacuum jar having a substantially spherical bottom from the center of which extends a double-walled pipe, said discharge pipe open to the outside of the jar, consisting of an inner tube attached to the round bottom of the inner wall of said jar and an outer tube attached to the round bottom of the outer wall of said jar, said inner tube being open to the inside of the jar and the outer ends of said tubes being connected in a sealed joint.

10. A double-walled vacuum jar of glass comprising a substantially spherical body provided with a neck at the top, a double-walled glass pipe extending from the bottom of said spherical body, said pipe consisting of a pair of concentric spaced tubes carried by the inner and outer walls of the jar, the inner tube being open to the interior of the jar and the outer ends of the tubes being fused together in a sealed joint, whereby said double-walled pipe constitutes an open tubular continuation of the annular vacuum chamber of the jar.

11. A double-walled vacuum jar open at the top and provided at the bottom with a double-walled discharge pipe, and a sealed exhaust tip projecting from said jar independently of said pipe.

12. A double-walled vacuum receptacle comprising a spherical body open at the top and provided at the bottom with a double-walled discharge pipe, said spherical body having a sealed exhaust tip at a distance from said pipe.

AURIN E. PAYSON.
MINER P. WETMORE.